United States Patent [19]

Voigt et al.

[11] 4,307,756
[45] Dec. 29, 1981

[54] THERMALLY INSULATED TUBING

[75] Inventors: Hermann-Uwe Voigt, Langenhagen; Horst Matzat, Garbsen, both of Fed. Rep. of Germany

[73] Assignee: Kabel-und Metallwerke, Gutehoffnungshuette Aktiengesellschaft, Hanover, Fed. Rep. of Germany

[21] Appl. No.: 79,440

[22] Filed: Sep. 27, 1979

[30] Foreign Application Priority Data

Sep. 27, 1978 [DE] Fed. Rep. of Germany ....... 2841934

[51] Int. Cl.³ .............................................. F16L 9/14
[52] U.S. Cl. ..................................... 138/149; 138/132; 138/139; 138/143; 138/145; 138/DIG. 9; 138/156; 428/921; 174/121 A
[58] Field of Search ............... 138/132, 133, 137, 139, 138/143, 149, 156, 145, DIG. 9; 428/921; 174/121 A

[56] References Cited

U.S. PATENT DOCUMENTS

| 497,535 | 5/1893 | Cummings | 138/149 X |
|---|---|---|---|
| 3,434,502 | 3/1969 | Snelling | 138/149 X |
| 3,473,575 | 10/1969 | Vogelsang et al. | 138/149 |
| 3,529,632 | 9/1970 | Johns | 138/149 X |
| 3,552,445 | 1/1971 | Andrews | 138/149 X |
| 3,778,408 | 12/1973 | Burns et al. | 428/921 X |
| 3,821,067 | 6/1974 | Taylor et al. | 428/921 X |
| 4,213,487 | 7/1980 | Funk et al. | 138/149 |

*Primary Examiner*—James E. Bryant, III
*Attorney, Agent, or Firm*—Smyth, Pavitt, Siegemund & Martella

[57] ABSTRACT

A spacer is coiled about a drawn, seamless copper tube, and a metal foil or metallized paper ribbon is folded around the coiled spacer. A blend for foaming is injected into the unoccupied space between the folded foil or ribbon and the inner tube, to generate a cyanurate-modified polyurethane foam network in which phosphorous or halogen molecules are embedded by chemical bond. A flame-resistant ribbon is folded about the metal tube. The resulting product and further details of the process are described.

8 Claims, 2 Drawing Figures

4 ALUMINUM FOIL OR ALUM.-COATED PAPER

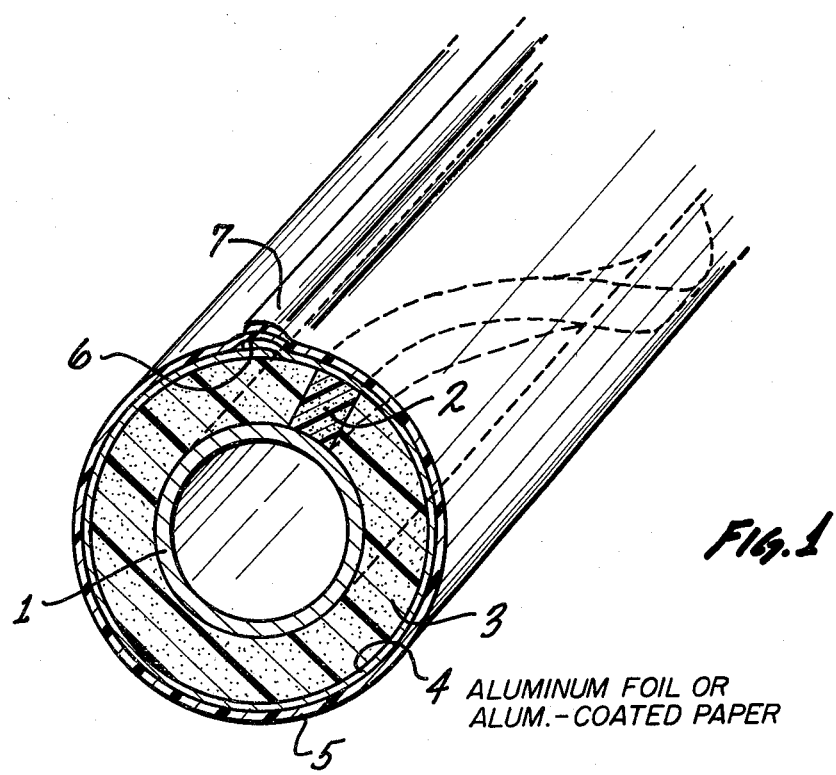
*Fig. 1*
4 ALUMINUM FOIL OR ALUM.-COATED PAPER
*Fig. 2*
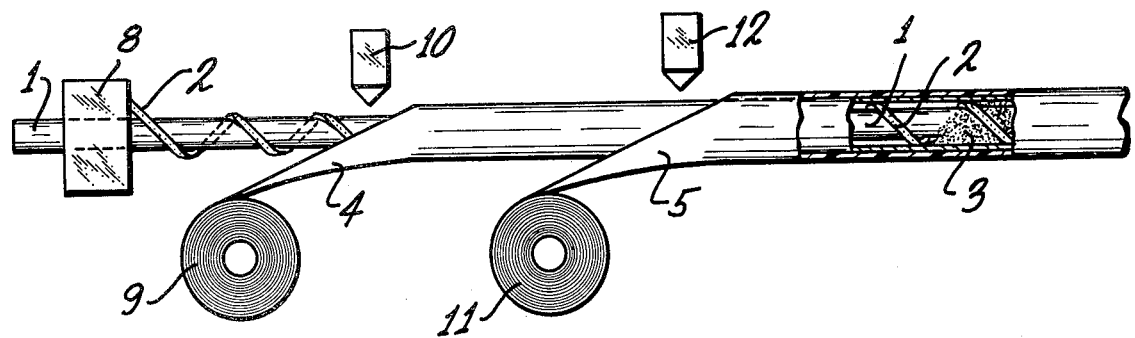

THERMALLY INSULATED TUBING

BACKGROUND FO THE INVENTION

The present invention relates to thermally insulated tubes, and, more particularly, the invention relates to tubing which is comprised of a seamless metal tube, preferably a drawn copper tube; a foil formed around that tube to provide a second, coaxial outer tube; and a spacer construction which includes a polymer foam, providing additionally a thermally insulating function as between the first-mentioned inner tube and the outer, tubular foil.

The German printed patent application No. 2,613,741 discloses a thermally insulated tube construction of the type referred to above which includes a metal tube, and a metal ribbon coaxially enveloping the tube and being spaced therefrom by a synthetic foam. In particular, a foam on the basis of polyisocyanurate is used which has been made flame resistant in a manner described in that printed application. Also, the metal ribbon is coated with a flame-resistant copolymer. The foil or metal ribbon formed into an outer tube serves as a kind of mold. Upon forming this tube, the edges of the foil are folded up, resulting in a radially outwardly extending and cemented tab which is subsequently folded down onto the surface of this tube.

This known tube is quite expensive to make, and the foil edges and tab are highly visible. Moreover, the tube just barely meets flame-resistant standards as, for example, laid down in the German Industry Standard DIN No. 4102, and then only in the beginning. Sooner or later, the flame-resistant additives diffuse more or less rapidly out of the foam, so that the actually provided protection lasts temporarily only. Moreover, the known flame-retarding additives which are included in the foam act frequently also as softener, thereby interfering with the spacing and support function of the insulation. The insulation foam becomes also thermally instable in some cases.

DESCRIPTION OF THE INVENTION

It is an object of the present invention to avoid the deficiencies outlined above and to provide a less expensive thermally insulated tube having persisting flame-resisting properties.

It is a specific object of the present invention to improve tubes or tubular assemblies being comprised of an inner tube, an outer tube, and a spacing and thermally insulating construction disposed in between the tubes, which construction includes a flame-resisting foam.

In accordance with the preferred embodiment of the present invention, it is suggested to improve the spacer and insulating construction as per the specific object by using an isocyanurate-modified polyurethane foam which includes uretane groups as well as, and predominantly so, isocyanurate groups; the polyol used for the reaction is a polyether-polyol to which are chemically bonded molecules of a substance having flame-retarding and flame-resisting properties. The foam, therefore, is a particular isocyanurate-modified polyurethane network in which the molecules of the flame-retarding substance are embedded by chemical bond. This network has resulted specifically from the following reaction. A halogenized or phosphorylized polyether polyol was reacted with an aromatic polyisocyanate in the presence of a blowing agent (e.g., monofluorotrichloromethane), a catalyst for the polyurethane reaction, and a trimerizing catalyst for the isocyanurate reaction.

The outer tube of the assembly is made from a metal foil or ribbon of at least 0.05 mm but, preferably, not more than 0.5 mm thickness, a thickness of 0.1 mm to 0.2 mm being preferred. The metal foil has been folded into a tube with overlapping and subsequently sealed edges, preferably under slow curing conditions, so that in situ foaming is completed prior to, e.g., hardening of the edge-to-edge adhesive band. This outer metal foil tube is covered by an envelope made of a flame-resisting synthetic, such as a rigid polyvinylchloride ribbon which has been formed into a tube sitting tight on the metal foil without being connected thereto. The metal foil provides a tight seal to prevent any gases from escaping the interior of the cable which, in the case of fire, could add fuel. Also, the metal foil tends to dissipate thermal energy. The flame-resisting polyvinylchloride envelope improves the overall appearance and protects metal foil underneath.

The tube made in accordance with the invention is quite inexpensive and persistantly flame resistant.

The preferred embodiment of the invention, the objects and features of the invention, and further objects, features and advantages thereof will be better understood from the following description taken in connection with the accompanying drawings.

DESCRIPTION OF THE DRAWINGS

FIG. 1 is a perspective section view of a tube in accordance with the preferred embodiment of the invention;

FIG. 2 is a schematic view of a tube-making process, and equipment for practicing the process in accordance with the preferred embodiment of the invention.

Proceeding now to the detailed description of the drawings, FIG. 1 illustrates a drawn, seamless copper tube 1 about which a spacer 2 has been helically coiled. The spacer is made of a synthetic foam such as polyurethane. The space adjacent to spacer 2 is occupied by a layer or filling 3, also made of synthetic foam on the basis of polyisocyanaurate-polyurethane.

Spacer 2 and filling 3 are enveloped by an aluminum foil or ribbon 4 with overlapping and bonded together or cemented edges 6. The overlap is such that a tab was not formed. This tubular foil 4, in turn, is enveloped by a ribbon 5 made of rigid polyvinylchloride and here also, the edges of the PVC ribbon overlap and are bonded together at point 7. One will use here a fusion adhesive.

We now turn to details of this particular tube. The metal tube 1 is of conventional design and construction; as stated, a seamless, drawn copper tube is preferred. In order to permit stripping of the insulation for the purpose of connection to other equipment, to fittings, etc., it is advisable to provide a thin film of a suitable separation medium onto tube 1. Regular wax, paraffin, or the like, is quite suitable for this purpose.

As far as the present invention is concerned, the composition of filler 3 is of critical interest. This foam includes chemically bonded, flame-resistant, and flame-retarding additives to prevent the spreading of any fire by means of and through this insulation. These additives were chemically bonded to the polyol portion used in the making of the foam. This way, the additives remain bonded and are prevented from migrating out of the foam; and even in the case of high temperatures (such as during a fire), these fire-proofing components will not escape, at least not prematurely.

Preferably, one uses halogenized or phosphorylated polyether polyols which, together with an aromatic polyisocyanate, establish an isocyanurate-modified polyurethane network and foam in which the halogen or the phosphorus is embedded by chemical bond. The halogen or the phosphorus is the flame retardant, and since it is included in the network, it is a nonvolatile component thereof. This way, the network as a whole remains flame resistant with certainty.

The method foil 4 is preferably made of aluminum having a thickness of about 0.1 mm to 0.2 mm. Its primary function is to retain any gases that may develop in the foam during a fire, so that these gases will not contribute to the fire as a fuel. If the metal foil 4 is exposed directly to any fire, its high thermal conductivity tends to dissipate and spread thermal energy in order to thereby prevent excessive local heating of the insulation underneath.

Another important function of the aluminum foil 4 is to prevent gas diffusion of the foaming or blowing agent, trichloromonofluoromethane, into the ambient air and replacement by air during aging of the foam. Such diffusion, if allowed, would reduce the thermal insulation capability of the foam. Presently, the foil aids to maintain a consistently low thermal conductivity through the foam, at least for a very long period of time.

The overlapping edges 6 of metal foil 4 should be bonded together by means of a slowly curing and hardening adhesive. This means that the bonding agent should not be completely cured and hardened until after completion of the in situ foaming, to be desc described below! In other words, as the pressure of the foaming action forces foil 4 againt outer cover 5, the overlapping parts can still yield, and the adhesive will harden and cure completely after the pressure conditions have stabilized. Seam 6 does not have to take any stress, but must seal the foil to prevent diffusion of any gas out of the envelope.

In an alternative configuration, metal foil 4 could be a metalization layer on a paper ribbon or a metalized, laminated ribbon. For example, one could use a paper ribbon having an aluminum coating. Such a laminated ribbon possesses a rather high reflectivity of thermal radiation, so that heat loss through radiation is impeded even more.

The outer envelope 5 is made from a polyvinylchloride ribbon or strip and includes flame-resisting additives. The ribbon should be at least 0.1 mm thick, preferably about 0.2 mm to 0.3 mm thick. It has four important functions. First, it provides protection of the metal foil 4 against corrosion. Second, dirt and dust do usually not cling to such a layer, so that envelope 5 improves the overall visual appearance of the tube. Third, envelope 5 protects foil 4 against mechanical damage. The envelope sits fairly tight on foil 4, but remains independantly movable. This feature is important for covering any nonreversible damage of foil 4 which still may occur in some cases. The polyvinylchloride envelope 5 has a certain elasticity which foil 4 does not possess. Envelope 5 is, therefore, quite insensitive to moderate impacts.

The fourth function of envelope 5 is to be flame resistant. In other words, the three functions outlined above require an envelope which, without further measures, would not have enough flame resistance. This flame resistance can be distinctly improved by adding antimontrioxide, and/or a phosphorous compound such as lead phosphite. If one uses a rigid polyvinylchloride, the adding of antimony provides for a synergism as far as rendering the ribbon flame resistant is concerned. The synergism involves the combined presence of antimony and of a halogen, such as chlorine. Generally speaking, one should add from 3 to, approximately, 10 per hundred parts polymer of an antimony ribbon material.

Another composition, which can be used for ribbon 5, is a blend of regular rigid polyvinylchloride and chlorinated regular polyvinylchloride, which blend is, in fact, quite flame retardant.

Still other foils which can be used are fluorinated carbohydrates such as polyvinylidene fluoride or polytetrafluoroethylene.

Proceeding now to the description of FIG. 2, the tube as shown in FIG. 1 is made in the following manner. Tube 1 enters the equipment; the tube may have been provided with a thin wax or paraffin surface film. The first piece of equipment illustrated is a coiler 8 through which tube 1 passes and which wraps spacer 2 about the tube in conventional manner. Aluminum foil 4 or an aluminum-coated paper ribbon is paid from a storage drum or reel 9 and wrapped and folded longitudinally about and on top of spacer 2. Conventional tools (not shown) thus form the ribbon or strip 4 into a split tube with overlapping edges. At some point, one applies also an adhesive to one or both edges of ribbon 4 before forming it into a tube.

A spray nozzle 10, or the like, injects a self-foaming compound into tube 4 about to be closed by the tube-forming tool. Nozzle 10 combines an aromatic polyisocyanate with halogenized or phosphorylized polyether. Previously, a foaming agent such as monofluorotrichloromethane and a catalyst blend has been edded to the polyol. The catalyst blend includes the regular catalyst for the polyurethane reaction and a trimerizing catalyst for the isocyanurate reaction. The polyol-blowing agent-catalyst blend composition can be regarded as component A and can be purchased as a premixed composition. This component A is halogenized or phosphorylated. The aromatic polyisocyanate can be regarded as component B, and components A and B are mixed in and applied by nozzle 10. The ratio of A:B is about 1:1.2. As a consequence, a modified polyurethane foam is generated in situ, which includes urethane groups and, primarily, isocyanurate groups.

Next, ribbon 5 of, e.g., rigid, flame-resistant polyvinylchloride is paid from a drum or spool 11 and formed into a split tube with overlapping edges. Just prior to obtaining the overlap but during the gradual, longitudinal folding of the ribbon, a fusion adhesive is applied to the edges by means of a nozzle 12, and rollers on an annular tool (not shown) urge these edges against each other, to complete the assembly. Alternatively, the edges of the plastic or synthetic ribbon 5 could be welded. The weld or adhesive bond should be completed prior to foaming, which is different from the completion of the bond of the metal foil edges! Fast bonding or welding of the plastic ribbon edges aids in holding the assembly together during the foaming process.

As was mentioned earlier, the adhesive used for bonding foil edges 6 together is to be of the slow-curing type, so that the edges can still tangentially slide in relation to each other. This is particularly so during the period of foaming, when the blowing agent causes the development of foaming pressure. The foil and its edges are thereby forced against the already bonded or welded outer cover made of ribbon 5. The foaming pressure, in turn, enhances the bonding action of the adhesive on foil edges 6 which will cure subsequently to the completion of foaming.

FIG. 2 shows the two ribbons 4 and 5 to be formed sequentially into a tubular configuration. This physical separation is not necessary; they may, in fact, be folded concurrently, being approximately guided into an overlapping position right in, or even ahead, of the folding zone.

It was found advantageous to preheat the various parts, prior to processing and assembly, to 40° C.–50° C. This preheating involves particularly copper tube 1 and aluminum foil 4, possibly also polyvinylchloride ribbon 5. Thus, it is desirable to provide for a warm "mold" of the foam plastic. If the boundaries of that mold (i.e., tubes 1 and 4) are cold, they are being heated by the exothermic reaction of foaming, so that thermal energy is extracted from the foaming substance. As a consequence, the foam will be denser, i.e., less "foamy" adjacent to those originally cold mold walls 1 and 4. The degree of foaming is thus reduced, and the the overall assembly is heavier and provides less thermal insulation. Heavy outflow of thermal energy interfers also with the cross linking, so that the foam cross-links to an insufficient degree only, particularly adjacent to the cold border zones. All these problems are avoided by preheating tube 1 and foil-to-become tube 4. Generally, it is quite important that the components for the foam are at the right temperature (20° C. to 22° C.) and are mixed in the proper proportions; they must be properly activated, in the sense that the speed of the reaction for the foam and for the generation of the network matches the manufacturing speed of the tubular assembly as a whole (or vice versa). Accordingly, the full expansion of the foam occurs only after the edges of ribbon 5 have been fused. This aspect is representatively depicted in the right-hand portion of FIG. 2, showing the tube assembly cut open in parts to demonstrate the somewhat delayed foaming action.

The invention is not limited to the embodiments described above, but all changes and modifications thereof not constituting departures from the spirit and scope of the invention are intended to be included.

We claim:

1. Thermally insulated tube for installation in buildings, or the like, comprising:

a metal inner tube;

a metal foil or ribbon of at least 0.05 mm thickness, having been formed into an outer tube and disposed coaxially about the said inner tube and having overlapping interconnected edges;

spacer means on the inner tube and supporting the outer tube, there being space left between the inner and outer tubes not occupied by the spacer means;

a foam in said space being comprised of an isocyanurate-modified polyurethane network which includes urethane groups and primarily isocyanurate units, resulting from and being the reaction product of an aromatic polyisocyanate, and of a polyether polyol in chemical bond with molecules of a flame-resisting substance, in the presence of a catalyst blend which includes a trimerizing catalyst for the isocyanurate reaction; and a synthetic flame-resisting envelope on the metal foil tube, in intimate contact but without interconnection therewith.

2. Tube as in claim 1, said modified polyether polyol being a halogenized or phosphorylated polyether polyol.

3. Tube as in claim 1, said metal foil having a thickness not exceeding 0.5 mm.

4. Tube as in claim 3, said metal foil having a thickness between 0.1 mm and 0.2 mm.

5. Tube as in claim 1, said foil being established by an aluminum coating on a paper backing.

6. Tube as in claim 1 or 2, said envelope being a longitudinally folded ribbon with overlapping and interconnected edges.

7. Tube as in claim 6, said synthetic envelope being a rigid polyvinylchloride treated with antimony.

8. Tube as in claim 1, said envelope being made of polyvinylchloride to which antimony trioxide or a phosporous compound has been added.

* * * * *